UNITED STATES PATENT OFFICE

ERVIN G. BAILEY, OF CLEVELAND HEIGHTS, OHIO, ASSIGNOR, BY MESNE ASSIGNMENTS, TO FULLER LEHIGH COMPANY, A CORPORATION OF DELAWARE

COMPOSITION OF MATTER

No Drawing. Application filed May 5, 1925. Serial No. 28,261.

This invention relates to a composition of matter to be used as a heat transmitting bond especially useful for certain purposes which will be explained.

In certain kinds of furnace construction and appurtenances to steam generators and furnaces it is desirable to have a heat conducting bonding material capable of being applied in plastic condition somewhat like a cement, and when hardened or set having the properties of adhesiveness and cohesiveness, to the extent that it will not disintegrate, and also being of a sufficiently refractory nature to be capable of resisting exposure to moderately high temperatures without detriment, but primarily having the property of relatively high conductivity of heat.

It is furthermore desirable that such material should be very plastic so that it will fit into and fill every crack and crevice when squeezed between two surfaces, and that it should be capable of drying, whether slowly or rapidly, with a minimum of porosity.

In a certain type of furnace construction devised by me, forming the subject of another application for Letters Patent, it is necessary to form a union or bond between metal blocks, tiles, or refractory lining components, and tubes containing a circulating cooling medium by which the heat is abstracted from the lining sufficiently to protect the latter from rapid deterioration by the high temperature and flame action.

In order effectively to perform its function of conducting the heat from one to the other of the components, the bond should be practically air and gas tight, and devoid, as far as possible, of air filled voids, and the purpose of the present invention is to produce a composition of matter having the requisite properties satisfactorily to meet all the requirements and of such nature that it can be made up in advance of its use and remain of the correct consistency while being used, without alteration due to drying while being applied.

The said material comprises a body portion of finely divided material of a sufficiently refractory and stable nature and a good conductor of heat, said body material being mingled with a suitable fluid and preferably cementitious substance serving as a vehicle to impart the necessary plasticity, which will dry out or set and form a solid union with the particles of body material, water glass or sodium silicate being suitable for the cementitious component of the vehicle, contributing the property of adhesiveness to unite the particles of the pulverulent solid.

Mixtures of water glass with pulverized solid refractory material have been used in some cases as a refractory cement, but I have found that such composition is unsatisfactory as a bonding material for which the requirements are such as above indicated.

A water glass solution does not serve as a suitable vehicle in connection with the pulverulent heat conductive body material to produce the desired plastic bonding material for various reasons which need not be set forth in detail, among which is the fact that it dries too rapidly for effective handling and also results in a porous substance when set, of relatively low heat conductivity.

I have discovered that a mixture of glycerine and waterglass affords a suitable vehicle for the heat conductive powdered solid material, and together therewith produces a plastic bonding material which is readily workable and capable of application in the furnace construction as desired. The glycerine acts as a retarder to the evaporation of water from the compound and has the effect of delaying or controlling the expulsion of the water from the bonding material in setting under the action of heat and thereby results in a denser and more effective bond or heat conducting union of the parts between which the material is interposed, than is produced by a refractory cement composed of waterglass and a pulverulent refractory body material. In the furnace construction above referred to, the temperature to which the bonding material is exposed is usually somewhere between 200° and 600° Fahrenheit, and the bonding material forming the subject of this invention is of such nature that it will dry out and set into a dense cohesive solid when exposed to such temperature, so that a furnace may be put into operation directly after the parts including the bonding material have been installed, which admits of repair or replacement with the minimum loss of time.

I have found that various pulverulent conductive solid materials may be used as the body of the bonding material, such for example as finely divided metal such as iron or copper, or carborundum, or various metal oxides such as hematite, or copper oxide, which are in general more stable under exposure to heat than metals.

I have found that a suitable specific vehicle or flux to be incorporated with the solid pulverulent heat conductive body material is composed of approximately two parts of water glass with a specific gravity of 1.41 to one part glycerine of a specific gravity of 1.25.

I have also found that a very satisfactory body material for the purpose above stated is hematite, or carborundum, in very fine state, preferably finer than 300 mesh, and a suitable proportion of the ingredients for an effective example of a composition of matter embodying this invention is 100 parts carborundum, to 40 parts waterglass, and 20 parts glycerine, although I desire it to be understood that the invention is not limited to these specific materials or proportions.

I claim—

1. A composition of matter comprising finely divided carborundum, waterglass, and glycerine in substantially the proportions of 100 parts of carborundum to 40 parts of waterglass to 20 parts of glycerine.

2. A refractory heat-conducting bonding material comprising a pulverulent heat-conducting body material, water glass, and glycerine in an amount sufficient to control the evaporation of water and produce a dense non-porous heat-conducting bond when subjected to furnace temperature.

3. A refractory heat-conducting bonding material comprising finely-divided carborundum, water glass, and glycerine in an amount sufficient to control the evaporation of water and produce a dense non-porous heat-conducting bond when subjected to furnace temperature.

ERVIN G. BAILEY.